United States Patent [19]
Paul, Jr.

[11] 3,779,508
[45] Dec. 18, 1973

[54] VENTURI-BALL VALVE
[76] Inventor: Herman L. Paul, Jr., 720 Old Mill Rd., Wyomissing, Pa. 19610
[22] Filed: Nov. 17, 1971
[21] Appl. No.: 199,516

[52] U.S. Cl................................ 251/124, 251/361
[51] Int. Cl........................................... F16k 47/00
[58] Field of Search................. 137/454.2, 454.5, 137/454.6; 251/595, 124, 363, 361 204, 211, 360, 366, 363

[56] References Cited
UNITED STATES PATENTS

| | | | |
|---|---|---|---|
| 3,176,720 | 4/1965 | Donahue........................ | 251/363 X |
| 3,273,851 | 9/1966 | Rosch et al...................... | 251/124 |
| 3,506,030 | 4/1970 | Vesco.............................. | 137/59.5 |
| 3,145,010 | 8/1964 | Karr................................ | 251/361 X |
| 2,822,818 | 2/1958 | Breznick........................ | 137/454.6 |
| 3,073,566 | 1/1963 | Bredtschneider............. | 251/363 X |
| 3,521,667 | 7/1970 | Johnson......................... | 137/454.6 |

*Primary Examiner*—Henry T. Klinksiek
*Attorney*—Thomas E. Tate

[57] ABSTRACT

A venturi-ball valve including a body having coaxial inlet and outlet passages and a through opening substantially normal to the axis of the passages and communicating with the inner ends thereof. The inlet and outlet passages taper inwardly in the direction of the through opening. The body is adapted to be temporarily or permanently disposed in a fluid flow line. A pair of spaced seat rings is provided in the through opening, one at the juncture of the opening and the inlet passage and the other at the juncture of the opening and the outlet passage. The seat rings are carried by a removable tubular seat retainer which is located in the through opening. A ball cage containing a sealing ball is slidable along the through opening and the seat retainer by means of an operating stem which extends above the cage and through the top of the body. The ball permits or prevents fluid flow through the outlet passage depending on the position of the cage in the through opening. The seat retainer and the seat rings constitute a subassembly which may be readily positioned in the through opening at the same time of assembly and removed therefrom for purposes of inspection or replacement of the seat rings, as required, without disturbing the operating stem or other parts of the valve or disconnecting the valve from the flow line.

2 Claims, 1 Drawing Figure

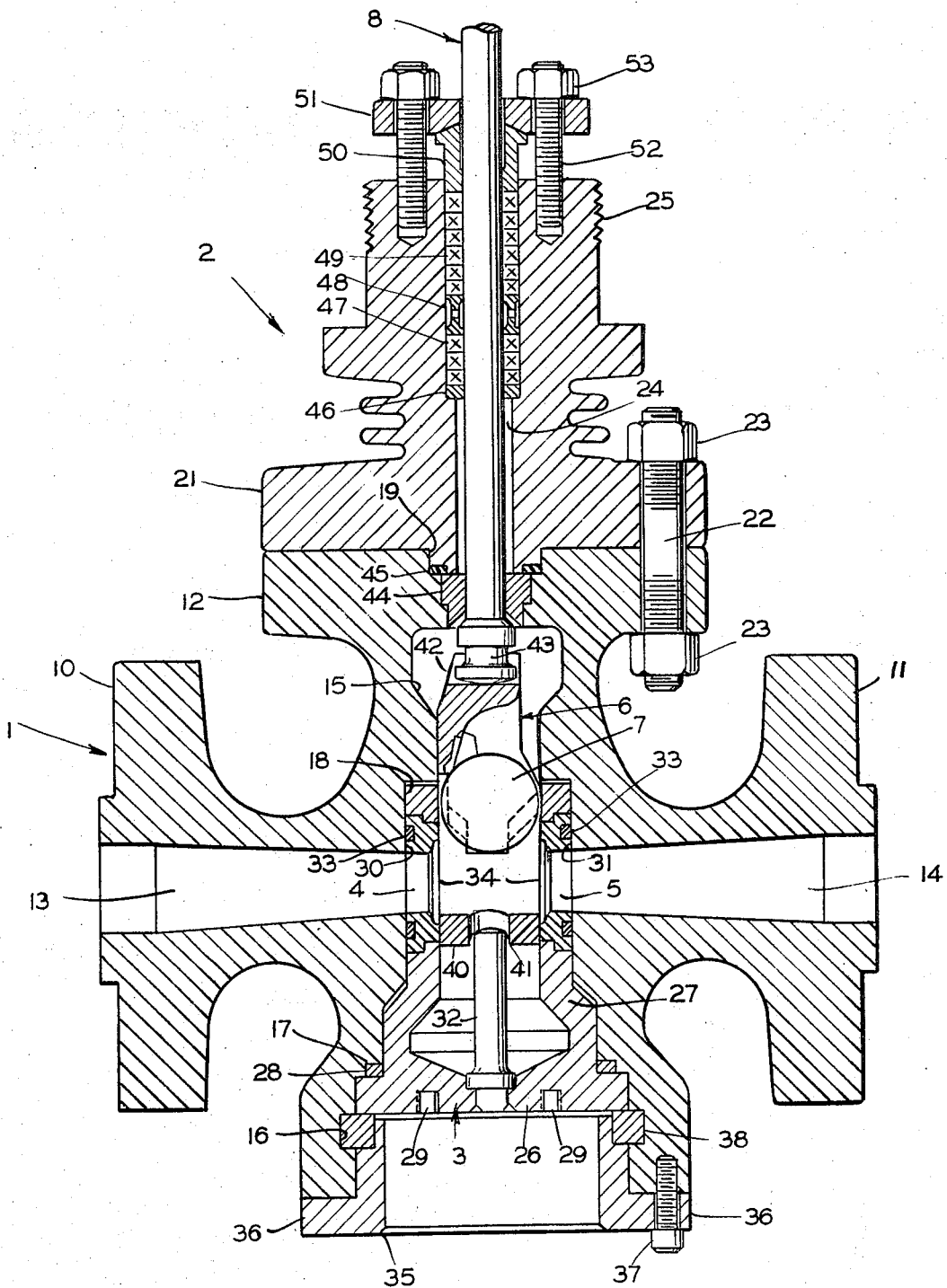

VENTURI-BALL VALVE

BACKGROUND OF THE INVENTION

This invention relates to the art of valves for controlling fluid flow and, more particularly, to a ball type control valve having improved features of design and construction. The invention pertains, in one of its more specific aspects, to a ball valve having its parts so constructed and arranged as to permit ready removal and replacement of seat rings for the ball, as required, without removing or disturbing the valve operating stem or associated parts or disconnecting the valve from a flow line after installation has been completed.

The valve art is one of the oldest and most highly developed industrial fields. This art includes a wide variety of mechanical control valves, including ball valves. There have been many advances over the years in ball-type control valves. Such advances are exemplified by the ball valves disclosed in several of my U.S. Pats., namely, No. 2,666,617, No. 2,923,316 and No. 3,264,718, which are related in a broad sense to the subject inventive valve.

The present ball valve differs in a number of respects over the valves of my above-identified patents and other known prior art valves. For one thing, the parts of this valve are so constructed and arranged as to permit of ready access to and withdrawal of removable seat rings from the valve for purposes of inspection or replacement. This is accomplished without disturbing the usual valve operating stem or parts associated with the stem and without disconnecting the valve from a flow line after it has been installed in the line.

As will be manifest from the ensuing discussion and detailed description, the ball valve of this invention affords a number of worthwhile advantages and benefits which contribute substantially to its improved utility as compared to similar known valves.

SUMMARY OF THE INVENTION

The ball valve of this invention includes a body having inlet and outlet passages and a through opening which communicates with these passages. Positioned within the through opening is a seat retainer comprising a tubular wall which is open at one end and a wall across the other end. The tubular wall is provided with a pair of oppositely arranged openings for reception of corresponding removable seat rings which establish communication between the inlet and outlet passages and the interior of the tubular wall. A ball cage is slidable in the tubular wall and carries a movable ball that is adapted to engage and provide an effective seal with the seat ring that is nearest the outlet passage. The valve also includes operating means, such as a stem, for actuating the cage whereby to adjust the position of the ball and correspondingly control fluid flow to the outlet passage. A pin within the confines of the seat retainer is adapted to project into the cage and engage the ball upon predetermined sliding movement of the cage in the direction of the seat retainer. The seat retainer is removably maintained in the body through opening. The seat retainer and the seat rings constitute a subassembly which may be readily positioned in the through opening at the time of assembly and removed from the through opening for purposes of inspection and/or replacement of the seat rings.

The primary object of this invention is to provide a ball valve having improved features of design and construction.

Another object of the invention is to provide a ball valve in which the several parts, including a ball-containing cage, an operating stem for actuating the cage and a pair of removable seat rings, are so constructed and arranged as to permit quick and easy access to and withdrawal of the seat rings from the valve, as may be required for purposes of inspection or replacement, without disturbing the operating stem and/or the cage and without disconnecting the valve from a fluid flow line after it has been installed in the line.

A further object of the invention is to provide a ball valve, which is constructed and arranged as indicated in the preceding object, with a removable seat retainer which carries and positions the seat rings in the valve, the ball cage cooperating with the seat retainer to positively maintain the seat rings in proper position at all times with respect to the valve inlet and outlet passages.

A still further object of the invention is to provide a ball valve of the character indicated which is relatively simple and compact in design; which is rugged and durable in construction; which is reasonable in manufacturing, installation and maintenance costs; which may be made in a wide range of sizes and flow capacities; which permits of ready removal and replacement of parts that are subject to wear; and which is adapted to perform its intended functions in an efficient and trouble-free manner.

The enumerated objects and additional objects, together with the advantages of this invention, will be evident to persons trained in the art from the following detailed description and the accompanying drawing which respectively describe and illustrate a preferred embodiment of the invention.

BRIEF DESCRIPTION OF THE DRAWING

The single FIGURE of the drawing is a central, vertical, sectional view of a ball valve constructed in accordance with this invention.

DESCRIPTION OF THE PREFERRED EMBODIMENT

Referring to the drawing, the therein illustrated ball valve comprises a number of principal parts, namely, a body 1, a bonnet 2, a seat retainer 3, a pair of seat rings 4 and 5, a ball cage 6 containing a sealing ball 7, and an operating stem 8. These parts and other parts associated therewith will now be described.

Body 1 is made of a suitable metal, preferably an appropriate steel alloy, and is provided with a pair of end flanges 10 and 11 and a top flange 12. The body is formed with an inlet passage 13 which tapers inwardly from flange 10 and an outlet passage 14 which tapers inwardly from flange 11. The inlet and outlet passages are coaxial. The body is also formed with a vertical through opening 15 which is normal to the axis of the inlet and outlet passages and which communicates with those passages. Successive portions of opening 15 vary in diameter, as shown. The body is machined or otherwise formed to define a plurality of annular recesses which merge with opening 15, including recesses 16, 17, 18 and 19. Body 1 is adapted to be placed in a fluid flow line (not shown) with its flange 10 connected to the upstream side of the flow line and with its flange 11 connected to the downstream side of the flow line. The connections between the flanges and the flow line may be temporary, such as by the use of removable bolts or the like, or permanent, such as by welding.

Bonnet 2 is also preferably made of a suitable steel alloy and is provided with a flange 21 which is coupled to body flange 12 by a plurality of studs 22 and corresponding nuts 23. The bonnet has a vertical through opening 24 which is coaxial with body opening 15. The upper end of the bonnet is threaded externally, as indicated at 25, for connection to other devices, such as power actuating means (not shown), if desired.

Seat retainer 3 is generally cup-shaped and includes a flanged bottom wall 26 and a tubular side wall 27 extending upwardly from the bottom wall. The seat retainer registers with a lower portion of through opening 15 and bears against a sealing gasket 28 in annular recess 17. Bottom wall 26 is provided with a plurality of blind openings 29 for reception of a suitable tool that is used in withdrawing the seat retainer from the valve body. Tubular wall 27 is formed with a pair of diametrically opposed recessed openings 30 and 31 for receiving and removably retaining respective seat rings 4 and 5. Secured to bottom wall 26, preferably by welding, and projecting upwardly therefrom is a centrally located pin 32.

Seat rings 4 and 5 are preferably made of stainless steel and are identical. Seat ring 4 registers with retainer opening 30 while seat ring 5 registers with retainer opening 31. Each seat ring carries a ring gasket 33. The opposing ends of the seat rings are machined to obtain corresponding recessed seat surfaces 34. Ball 7 is adapted to bear against seat surface 34 of seat ring 31 and cooperate therewith to obtain an effective seal when the valve is in closed position.

Seat retainer 3 and seat rings 4 and 5 constitute a subassembly which is inserted in body 1 and advanced to the illustrated position or withdrawn from the body by way of the lower portion of through opening 15. This subassembly is maintained in position by a retaining ring 35 having an external flange 36 which is removably secured to body 1 by screws 37. Interposed between the upper end of ring 35 and retainer bottom wall 26 is split ring 38 which registers with recess 16 in the body.

Ball cage 6 is generally the same as that disclosed in my said U.S. Pat. No. 3,264,718 to which reference may be had for details of construction in addition to those appearing herein. Cage 6 includes a bottom end wall 40 having a central through opening 41 to freely accommodate the upper portion of pin 32. The ball cage is provided with a slotted upper end 42. The cage is slidable in the vertical opening defined by retainer tubular wall 27 and the portion of body opening 15 thereabove. The cage also bears against seat rings 4 and 5 and maintains them in proper position at all times with respect to inlet passage 13 and outlet passage 14.

Reference is next had to operating stem 8 which, as illustrated, extends through bonnet opening 24 and into body opening 15. The operating stem is provided at its lower end with a grooved head 43 that engages and cooperates with the slotted upper end 42 of the ball cage. Coaxial with the operating stem and arranged as shown, are a bonnet bushing 44, a bonnet gasket 45, a spacer ring 46, packing 47, a lantern ring 48, packing 49, a gland 50 and a follower ring 51 which is affixed to the upper end of the bonnet by studs 52 and nuts 53.

Based on the foregoing, it is believed that the construction, operation, objects and advantages of my present invention will be readily comprehended by persons skilled in the art, without further description. It is to be clearly understood, however, that various changes in the construction described above and illustrated in the drawing may be made without departing from the scope of the invention, it being intended that all matter contained in the description or shown in the drawing shall be interpreted as illustrative only and not in a limiting sense.

I claim:

1. A valve comprising, a body having horizontally opposed coaxial inwardly tapering inlet and outlet passages and a vertical through opening communicating therewith, a seat retainer removably positioned in the lower portion of the through opening and including an upwardly extending tubular wall portion open at its upper end and an end wall across its lower end, removable means for securing said removable seat retainer within said through opening, means for preventing relative rotation between said seat retainer and said body, the said tubular wall portion of said seat retainer having a pair of oppositely disposed openings formed therein in coaxial relation with said passages and in open communication therewith, a removable seat ring in each of said last-mentioned openings, a ball cage slidable in the tubular wall portion and including a ball freely movable there-within and adapted to engage and provide an effective seat with the seat ring adjacent the outlet passage, and means removably attached to said body at the top thereof and operatively connected to said ball cage for reciprocating same whereby to effect or permit a corresponding movement of said ball into and out of engagement with said adjacent seat ring.

2. A valve according to claim 1 further comprising an upwardly extending member carried by and positioned within the seat retainer, said member being adapted to project into the cage and engage the ball upon predetermined sliding movement of the cage in the direction of the seat retainer, the bottom of the cage being provided with an aperture aligned with said member to permit passage of said member therethrough.

* * * * *